H. L. PITMAN.
COMBINED TYPEWRITING AND COMPUTING MACHINE.
APPLICATION FILED JAN. 23, 1918.

1,345,877.

Patented July 6, 1920.

WITNESSES:

INVENTOR:
Henry L. Pitman
BY
ATTORNEY.

H. L. PITMAN.
COMBINED TYPEWRITING AND COMPUTING MACHINE.
APPLICATION FILED JAN. 23, 1918.

1,345,877.  Patented July 6, 1920.

WITNESSES:  INVENTOR:

H. L. PITMAN.
COMBINED TYPEWRITING AND COMPUTING MACHINE.
APPLICATION FILED JAN. 23, 1918.
1,345,877.
Patented July 6, 1920.
6 SHEETS—SHEET 4.
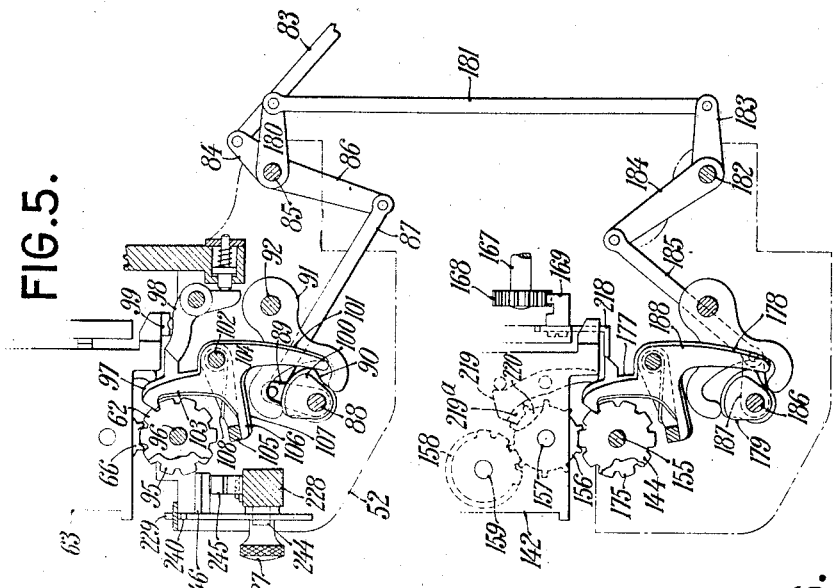
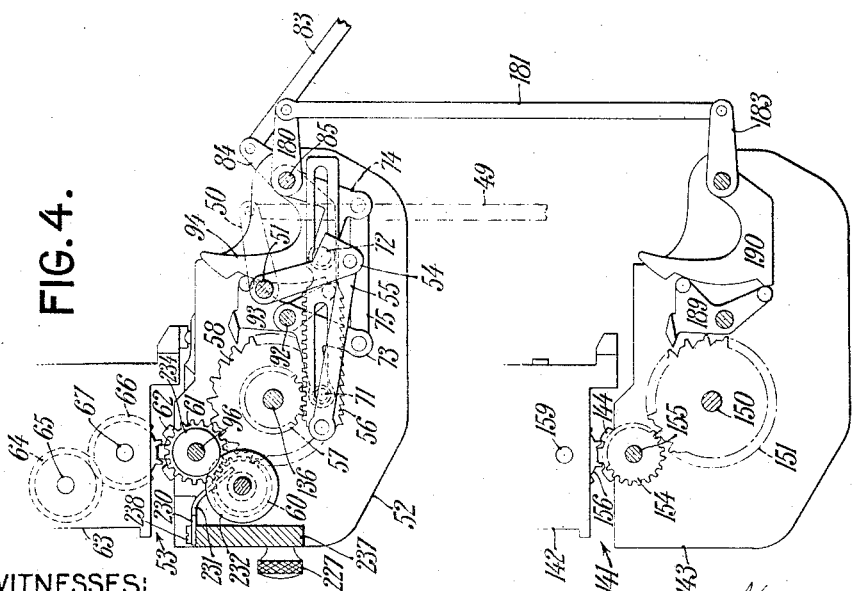
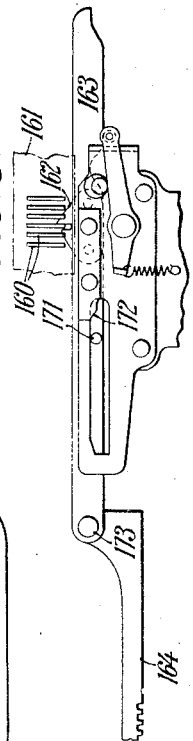
WITNESSES:
Arthur R. Johnson
John Waldheim
INVENTOR:
Henry L. Pitman
BY D. C. Stickney
ATTORNEY.

H. L. PITMAN.
COMBINED TYPEWRITING AND COMPUTING MACHINE.
APPLICATION FILED JAN. 23, 1918.
1,345,877.
Patented July 6, 1920.
6 SHEETS—SHEET 5.
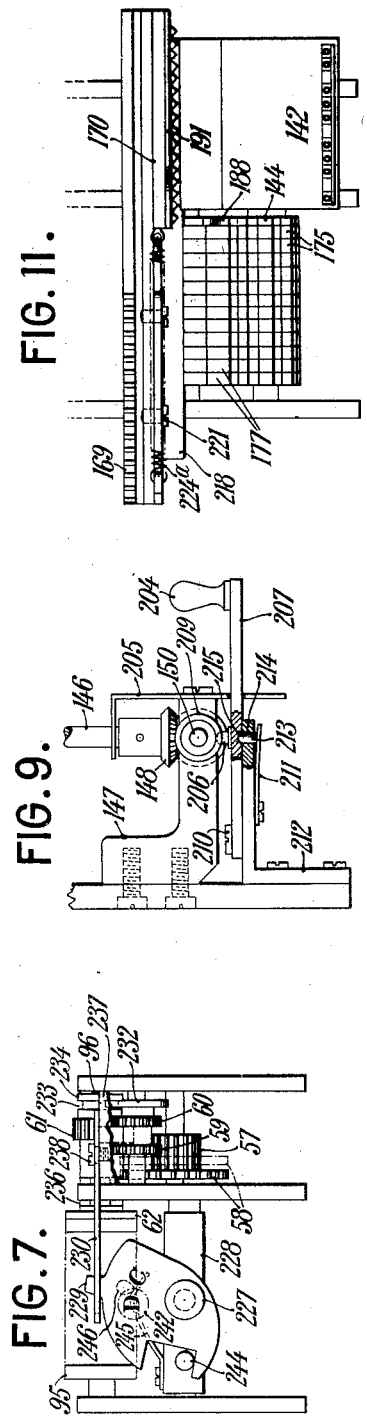
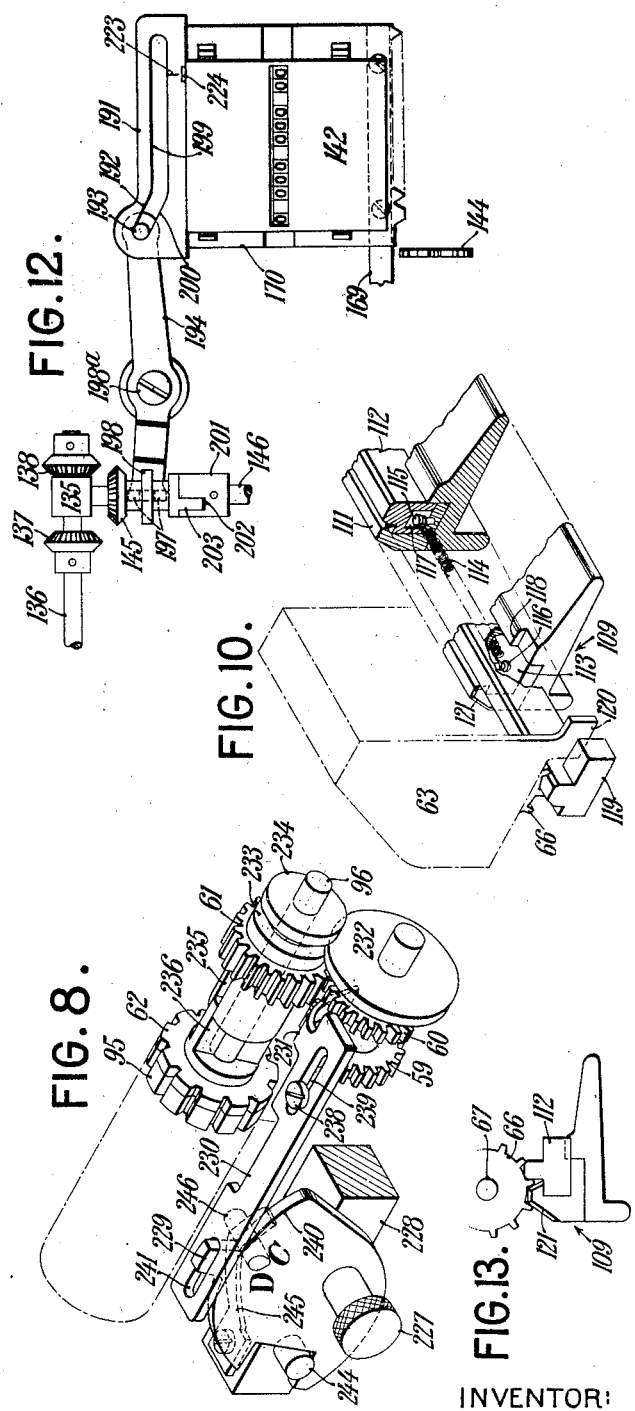
WITNESSES:
INVENTOR:
Henry L. Pitman
BY
B. C. Stickney
ATTORNEY.

H. L. PITMAN.
COMBINED TYPEWRITING AND COMPUTING MACHINE.
APPLICATION FILED JAN. 23, 1918.
1,345,877.
Patented July 6, 1920.
6 SHEETS—SHEET 6.
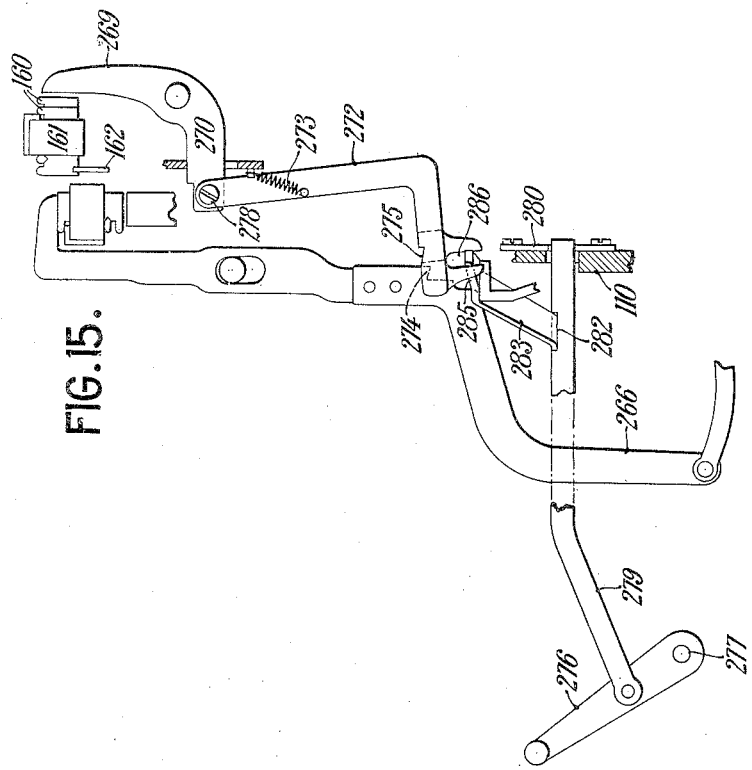
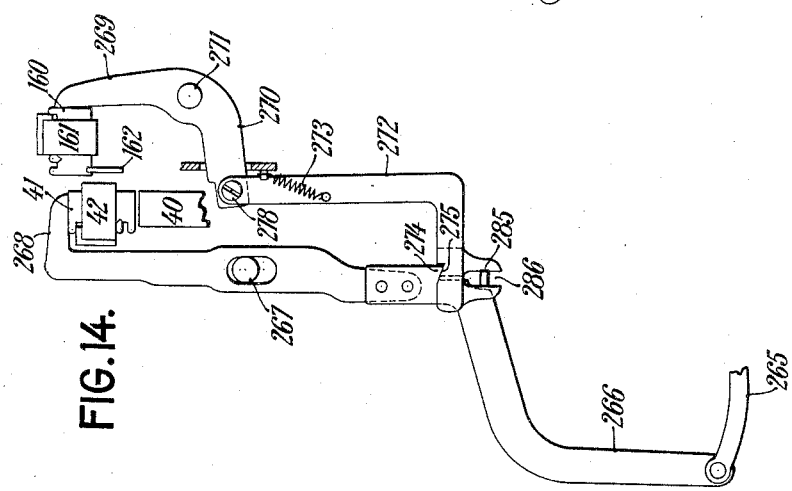
WITNESSES:
Andrew A. Johnson
John Waldheim
INVENTOR:
Henry L. Pitman
BY B.C. Stickney
ATTORNEY.

UNITED STATES PATENT OFFICE.

HENRY L. PITMAN, OF EAST ORANGE, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,345,877.      Specification of Letters Patent.      Patented July 6, 1920.

Application filed January 23, 1918. Serial No. 213,279.

*To all whom it may concern:*

Be it known that I, HENRY L. PITMAN, a citizen of the United States, residing in East Orange, in the county of Essex and State of New Jersey, have invented certain new and useful Improvements in Combined Typewriting and Computing Machines, of which the following is a specification.

My invention relates to combined typewriting and computing machines, and certain features thereof relate to machines which not only compute vertical columns but also compute crosswise of said columns.

In such machines, of which the Underwood "Addendagraph" is an example, there are usually provided for this purpose two computing units, a column-computing unit and a cross-computing unit. The column-computing unit comprises a relatively-stationary master wheel, which is traversed by one or more column-totalizers, the latter having computing wheels with which the master wheel engages *seriatim*. For this relative travel the totalizers are secured to the typewriter carriage. The cross-computing unit also has a relatively-stationary master wheel; and the cross-totalizer, which comprises computing wheels, is mounted on a sub-carriage and is adapted to traverse said master wheel. The cross-totalizer travels intermittently during the run of the typewriter carriage; so that when a column-totalizer passes through a computing zone, the computation may be effected not only in the column-totalizer but also in the cross-totalizer. To effect this intermittent travel, pick-up elements are provided, each of which bears such a relation to its corresponding column-totalizer that immediately prior to the entrance of the latter into the computing zone, the pick-up element connects the cross-totalizer carriage with the typewriter carriage, to travel with the latter. As the column-totalizer passes out of the computing zone, the cross-totalizer carriage becomes released from the typewriter carriage by the disengagement of the pick-up hook from the pick-up dog, thus permitting the cross-totalizer carriage to jump back to its normal position.

One of the objects of my invention is to simplify and improve the mechanism of such machines, especially those known as the Underwood "Addendagraph," illustrated and described in my co-pending application, Serial No. 186,098, filed August 14, 1917. Another object is to perform certain operations automatically.

In said application 186,098, is shown a train of mechanism extending from the column-computing master wheel to the cross-computing master wheel, and a manual control to make or break said connection, for rendering the master wheel of the cross-computing unit effective or ineffective. Further, there is shown a non-compute key, which renders both computing units ineffective; this being done by breaking the connection between the numeral keys and the master wheel of the column-computing unit.

A feature of my invention is to automatically render the master wheel of the cross-computing unit effective when a cross-computation is to be effected. To do this, the connection between the master wheels may be normally broken and may be made effective automatically immediately prior to the entrance of a columns-totalizer into the computing zone.

The means for making and breaking this connection is preferably controlled by the typewriter carriage, and may comprise a make-and-break pinion shiftably connected with a shaft that is associated with one of the master wheels. This pinion may be shifted by the cross-computing carriage when the latter is moved by the typewriter carriage.

The effect of this automatic connecting up of the cross-computing master wheel may be nullified by means of the non-compute key.

I have also provided improved means for locking computing wheels of the column-totalizers to prevent accidental rotative displacement thereof when they are outside of the computing zone. This locking means is in the nature of a rail which extends along in front of the machine and is traversed by the column-totalizers, the rail occupying one of the notches in each of the wheels. The range of travel of the totalizers extends sometimes considerably beyond the sides of the machine frame, thus presenting the difficulty that the locking rail or bar would have to be made of such a length that it would project objectionably beyond the sides of the machine frame. To have the locking bar occupy as short a space as possible, I have shown it as formed in three sections, viz., a fixed section and two normally-retracted sections, one at each end of the fixed section. Either movable section may be extended to keep the computing wheels locked when a totalizer moves beyond the end of the fixed section of the locking rail or bar.

The extending of the sections of the locking bar may be done automatically by the typewriter carriage, and for this purpose the traveling totalizers may engage with projections on said movable sections. To return the sections to their normal positions, each is provided with a spring.

I have further provided a locking element in the form of a rail or bar to prevent accidental rotative displacement of computing wheels of the cross-totalizer. The rail may be effective when the cross-totalizer is in normal position, and the cross-computing wheels may be freed of said locking rail as the totalizer moves step by step through the computing zone, at which time the computing wheels are brought one by one into engagement with both the master wheel and a set of carry-over pinions.

It is sometimes desirable to subtract in the cross-computing unit when adding in the column-computing unit, and vice versa. To do this I have provided simplified and improved means, including a special key, and an indicator plate which may coöperate with an indicator having the word "Reverse" thereon, denoting the direction in which to move the key to change the state of the cross-computing unit only, so that a computation may be effected thereby, which is the reverse of that of the column-computing unit, irrespective of the kind of computation being done by the latter.

In said co-pending application No. 186,098, I have shown spring-pressed pawls associated with carry-over detents to prevent accidental displacement of carry-over pinions of the computing units. I have also shown therein cams on the totalizers, which depress the pawls to free the carry-over detents as the carriage passes through a computing zone. Since this form of release for the carry-over detents has a tendency to burden the spring drum of the typewriter carriage, I have devised a kind of lock for the carry-over detents of one of the computing units (preferably the cross-computing unit), which will automatically free the carry-over detents as the carriage passes through a computing zone, without adding to the work done by the spring drum. One form of this new lock means may comprise an element in the form of a bar, normally locking the detents. This bar traverses the detents, and releases them one by one, as the totalizer traverses the computing zone. For this purpose the bar is preferably secured to the cross-totalizer carriage.

I have found it possible to make provision for attaching the cross-totalizer to the sub-carriage irrespective of the width of the former, which may have different denominational capacities. An indicator aids in positioning the cross-totalizer relatively to the sub-carriage so that the lowest denominational position of the cross-totalizer always bears a definite relation to said sub-carriage. The locking bar, just referred to, is adjustable relatively to the cross-totalizer, so as to allow for different widths of the latter, so that the locking bar may always bear a definite relation to the position of the highest denomination of the cross-totalizer.

For rendering the column-computing master wheel ineffective, I have provided a disconnect-device which is shown in the form of a rotatable finger-piece and a bar actuable thereby to unmesh gear wheels, which form part of the driving mechanism for the master wheel. The finger-piece is provided with indications, which may be viewed through a sight-opening, to indicate the setting of the connections to the master wheel.

The typewriter carriage may be quickly brought to any denominational position in any column, so as to properly position the totalizer relatively to the master wheel, by means of tabulating mechanism including column-stops. These stops may be set individually to effective positions by a key at the keyboard of the machine.

The pick-up elements or dogs for the cross-computing unit may be similar in construction to that of the column-stops and may be set simultaneously with the column-stops. It is sometimes desired, however, to use the key to set the column-stops only. For this purpose I have provided simple and improved means whereby the effect of the key may be changed, to set only the column-stops, or the column-stops with the pick-up elements, at will.

Other features and advantages will hereinafter appear.

In the accompanying drawings.

Fig. 4 is a side view of the connection between the column-computing unit and the cross-computing unit, showing some of the driving mechanism for the master wheels of both units.

Fig. 5 is a similar view, showing the carry-over devices associated with the computing units.

Fig. 6 is a fragmentary rear view, showing part of the connection, comprising the pick-up hook, between the cross-totalizer and the typewriter carriage.

Fig. 7 is a front view of the connect-disconnect key associated with the master wheel of the column-computing unit, parts controlled thereby being shown in their connected position.

Fig. 8 is a perspective view of the same, showing more clearly a manually-operated slide under the control of the disconnect key, and the connection between said slide and the gearing connected with the master wheel.

Fig. 9 is a view, as seen from the left-hand side of the machine, of the reverse handle associated with the cross-computing unit.

Fig. 10 is a perspective view, showing one of the column-totalizers moved beyond the fixed locking-bar proper, associated with the carry-over transfer wheels, and showing one of its sections extended by the totalizer and moved against the tension of a return spring.

Fig. 11 is a fragmentary top plan view, showing the carry-over pinions of the cross-computing unit, the locking pawls associated therewith and the locking bar associated with said pawls.

Fig. 12 is a fragmentary front view of the cross-totalizer, showing the automatic control to connect or disconnect the driving mechanism for the master wheel of the cross-computing unit with that of the column-computing unit.

Fig. 13 is an enlarged detail side view, showing the relative locking position of a computing wheel, the locking-bar and one of its retracted sections.

Fig. 14 is a diagrammatic side view showing a column-stop and a pick-up dog being set simultaneously.

Fig. 15 is a similar view showing only the column-stop as being set, and some of the mechanism for setting the pick-up dogs as rendered ineffective by a suitable control lever.

Figure 1:
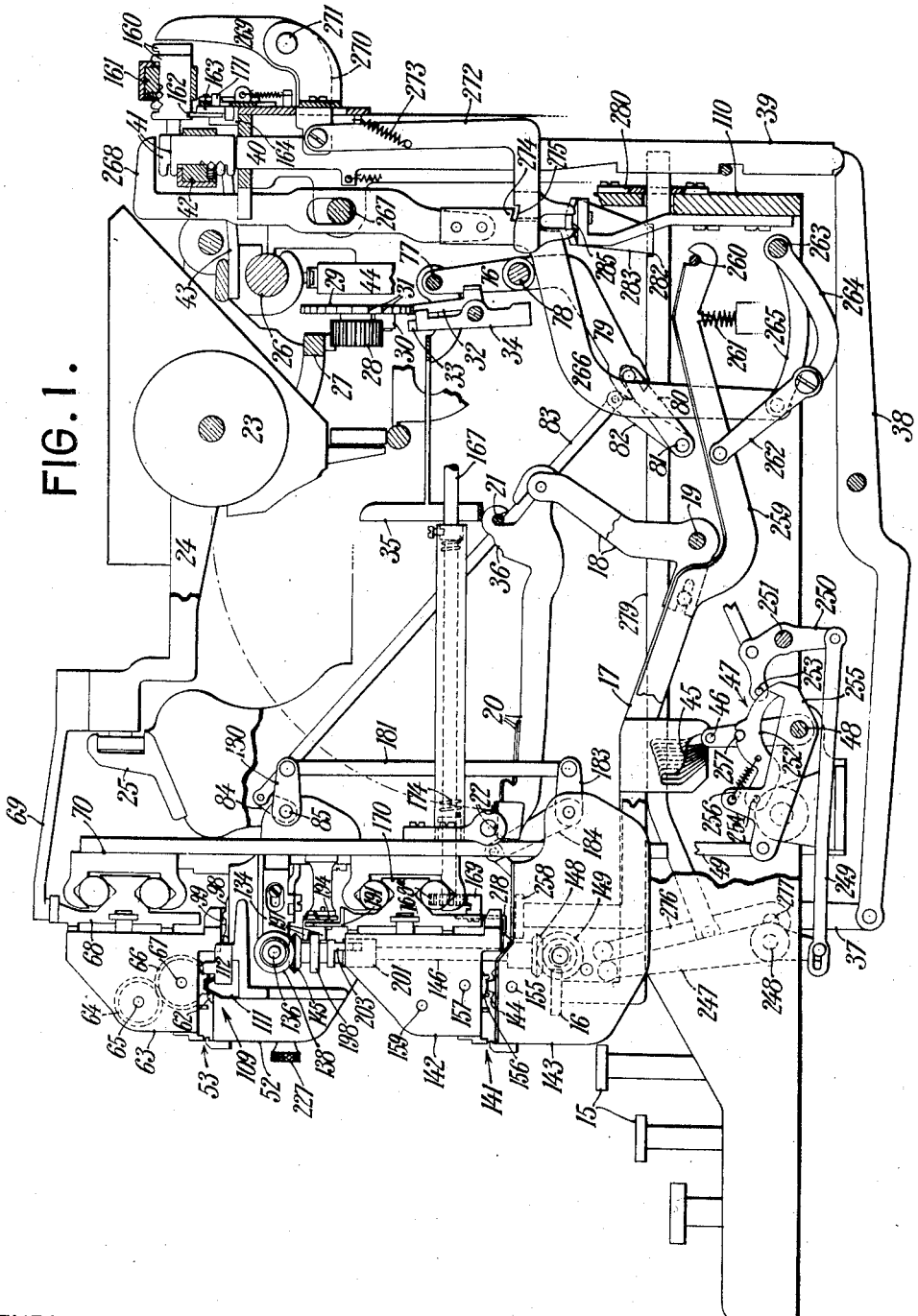
Figure 1 is a side view of the machine with parts broken away to show the interior structure.

Alphabet keys 15 and numeral keys 16, when depressed, swing key-levers 17 to rock bell-cranks 18 about a fulcrum rod 19, to swing type-bars 20 upwardly and rearwardly about a fulcrum 21, to cause types 22 to strike against the front side of a rotatable platen 23. The platen 23 is mounted for line-spacing movements, of a work-sheet, not shown, on a carriage 24, which travels back and forth on a front rail 25 and a rear rail 26.

For its letter-feeding movements, the carriage 24 is provided with a feed-rack 27, which meshes with a pinion 28 to rotate the latter. The pinion 28 is connected to rotate an escapement wheel 29 by the usual one-way acting pawls 30. The escapement wheel 29 is provided with teeth 31, which coöperate with a loose dog 32 and a fixed dog 33 on a dog-rocker 34 when the latter is vibrated by a universal bar 35, engaged by heels 36 of the type-bars 20 when the latter approach the printing point. The upper end of the dog-rocker is returned to its forward or normal position, as in the Underwood typewriter, by the usual springs (not shown).

The carriage 24 may be moved to bring any denominational position of a column on the platen to the printing point. To do this, there is provided a series of tabulator-keys 37, any one of which, when depressed, swings an associated lever 38 to move a plunger 39 to bring the upper end thereof, comprising a denominational stop 40, into the path of effectively-set column-stops 41 on a stop-bar 42 secured to the typewriter carriage by a bracket 43. The usual rack-releasing means (not shown in the drawings) may be actuated by any one of the plungers 39 to effect the releasing of the carriage by raising the rack 27 out of engagement with the escapement pinion 28 during the latter part of the upward movement of the plunger 39. The usual spring drum 44, after releasing the rack 27 from the escapement pinion 28, moves the carriage to the left until it is arrested by one of the effective column-stops coming into engagement with the denominational stop 40 on the projected plunger. The tabulator-key is then permitted to return to normal position, thus effecting a reëngagement between the feed-rack 27 and pinion 28.

Computing may be accomplished by the numeral keys 16, each being provided with a differential indexing or valuating cam 45. These cams vary in form, and, when actuated, coöperate with a bail 46, normally connected to a differential oscillator 47, to move the latter through different angular distances, corresponding to values from 1 to 9. The bail 46 is secured to a shaft 48, which forms a pivot therefor. The oscillator, when moved by the bail, pulls downwardly on a link 49 (Figs. 1 and 4), the upper end of which is connected to an arm 50 to rock a shaft 51, to which it is secured near the right-hand side of the machine. The rock-shaft 51 extends into an actuator 52 of a column-computing unit 53, and is provided at its inner end with a downwardly-projecting arm 54, which, when the rock-shaft is actuated, thrusts forwardly a connecting link 55 to move a driving rack 56 to rotate a pinion 57, meshing with the latter. It will be understood that the rack 56 may be moved for the various distances, according to the amount of movement imparted to the oscillator by the actuated numeral key. The pinion 57 is fixedly secured to a gear-wheel 58, so that the latter rotates therewith to transfer rotative movement to an intermediate pinion 59 (Fig. 2), the latter having a similar pinion 60, secured thereto, which meshes with a pinion 61 to rotate a master wheel 62; the latter comprising the relatively-fixed element of the column-computing unit.

The column-computing unit also comprises one or more column-totalizers or traveling elements 63, having dial-wheels 64, supported on a shaft 65; and to which the movements of the master wheel 62 are transferred through the intermediary of computing wheels or transfer wheels 66, mounted on a shaft 67 also contained within the totalizer or computing head 63. The column-totalizers 63 may be adjusted at columnar positions of the typewriter carriage and may be secured to a bar 68, connected to the typewriter carriage by suitable arms 69 so as to travel with the typewriter carriage, said bar being guided in its traveling movements by a suitable rail 70. As the typewriter carriage with a totalizer enters the computing zone, the transfer wheel 66, associated with the dial-wheel 64 of the highest denominational position in the computing head 63, is brought into effective relation with the master wheel 62. If a numeral key is depressed, while the totalizer is in this position, a movement will be transferred to said dial-wheel, through the intermediary of the driving rack 56, corresponding in value to the digit of the actuated numeral key. It will be remembered that during the actuation of the numeral key, the carriage escapement is also actuated, as hereinbefore described, thus permitting the typewriter carriage to move to the next letter-space position at the end of the return stroke of the numeral key, to thus bring the transfer wheel associated with the dial-wheel of next lower denomination into effective relation with the master wheel.

The driving rack 56 is moved out of engagement with the pinion 57 when it has reached the end of its forward movement. For this purpose, it is sidably mounted on studs 71 and 72 projecting laterally from bell-cranks 73 and 74, respectively, Fig. 4; the bell-cranks being connected to each other by a link 75, so that they move in parallelism when actuated to lower the driving rack 56 out of engagement with the pinion 57. The extent of forward movement, it will be remembered, is dependent upon the valuating cam 45 associated with the numeral key actuated at this time. During the latter part of the movement of the type-bar 20 to its printing position, it will be remembered, the heel 36 thereon engages with the universal bar 35 to move the latter rearwardly to actuate the escapement devices comprising the dog-rocker 34.

To actuate the driving rack-shifting or lowering mechanism, the universal bar when thus moved swings a frame 76, to which it is pivotally connected at 77, Fig. 1; the frame 76 having a rock-shaft 78 which serves as a pivot therefor. The forward end of an arm 79, extending downwardly from the rock-shaft 78, engages with an arm 80 located near the center of the machine and secured to a rock-shaft 81 extending from side to side of the machine. The rock-shaft 81 has at its left-hand side an arm 82 which moves a link 83 connected to an arm 84 to rock a shaft 85 to which it is secured. The rock-shaft 85 has secured thereto a downwardly-projecting arm 86 which is located near the left-hand side of the actuator 52, and which, when the rock-shaft 85 is actuated, moves a link 87 to rock a shaft 88, to which it is connected by means of an arm 89 extending from the rock-shaft 88. The rock-shaft 88 has secured thereto a cam 90 which is rotated therewith and engages with a forked arm 91 secured to a rock-shaft 92 to rock the latter.

It will be seen by an inspection of Fig. 4 that the bell-crank 73 of the parallel motion mechanism is also mounted on the shaft 92 to which it is secured. Therefore, this movement of the shaft 92, in a counterclockwise direction, is effective to rock the bell-crank 73 to lower the studs 71 and 72; the bell-crank 74, which is loosely mounted on the rock-shaft 85, being actuated by the bell-crank 73 through the intermediary of the connecting link 75.

The driving rack 56 during its return stroke may be held out of engagement with the pinion 57, preferably in a manner shown and described in my co-pending application, Serial No. 24,390, filed April 28, 1915, (now Patent No. 1,308,506, dated July 1, 1919). This mechanism comprises a latch (not shown), which is rendered effective at the end of the forward movement of the rack to hold it out of engagement with the pinion, and remains effective until the latter part of the return stroke of the rack, when the arm 54 renders said latch ineffective, thus permitting the rack to reëngage the pinion 57.

The gear-wheel 58 is held against accidental displacement, while it is out of mesh with the pinion 57, during the return movement of the driving rack 56, by a pawl 93, which is normally out of engagement with the gear 58, but is swung into engagement therewith by means of a cam 94 during the rocking movement of the rock-shaft 85; the cam 94 being rigidly secured, for this purpose, to said rock-shaft. The pawl 93 also serves to accurately position the gear-wheel 58, so as to assist in alining the teeth of the master wheel 62 relatively to those of the transfer wheels 66 after each movement thereof.

Tens-carry-over mechanism is provided for the column-computing unit. This is contained within the actuator 52, and comprises a series of carry-over pinions 95, which are placed adjacent to the master wheel 62; the carry-over pinions 95 being mounted on a shaft 96, with the teeth of all of the pinions in alinement with those of the master wheel, so that the master wheel and carry-over pinions may readily be traversed by the computing wheels 66 to be brought into coöperative relation therewith.

The carry-over pinions 95 and the transfer wheels 66 may functionate, during a tens-carry-over operation, in a manner similar to that illustrated and described in my co-pending application, hereinbefore-mentioned, Serial No. 24,390. The carry-over pinions 95 are normally prevented from rotating by detents 97, which are held against said pinions by spring-pressed bell-cranks 98. The bell-cranks 98 are depressed one at a time by a cam 99 on the totalizer 63 as the latter passes step by step through the computing zone. This is done to release the carry-over detents 97, and consequently the carry-over pinions 95, so that any one of the latter may be moved to effect a tens-carry-over from one dial-wheel to another. The carry-over detents 97 are also adapted to assist in alining the carry-over pinions 95 relatively to their teeth. This may be done by a cam 100, secured to the rock-shaft 88, which is rocked every time a numeral key is actuated, to engage with tails 101 extending downwardly from the detents 97 to slightly swing the detents 97 about a supporting rod 102, upon which they are pivotally supported, to force the upper end of the detents into the spaces between the teeth of the carry-over pinions 95. A detent 103 similar to the carry-over detents 97 is provided for the master wheel 62. This detent may also serve to aline the teeth of the master wheel with those of the carry-over pinions; the detent 103 being for this purpose provided with a tail 104, which is actuated by the cam 100, to swing the detent about the rod 102 and force the upper end of the detent between the teeth of the master wheel. The carry-over detents 97 and the master-wheel detent 103 may be assisted in their return movement by a universal bar 105, which is pivotally mounted on the rod 102 and is pressed against tails 106 and 107, respectively, of the carry-over detents 97 and the master-wheel detent 103, by a spring 108.

To prevent accidental displacement of the computing wheels 66, which would cause a displacement of the dial-wheels 64, there is provided a locking bar 109, having portions shaped to conform with the space, where they may engage, between the teeth on the computing wheels or transfer wheels 66. This locking bar extends along the front of the machine frame 110 and beyond the sides of the machine frame 110, and is shaped at its upper end to conform to the spaces between the teeth on the transfer wheels 66, and preferably below the column-totalizers, so that the computing wheels thereof may traverse the locking bar 109, to prevent accidental rotation thereof. The locking bar 109 is provided with a gap at the computing zone, in which the carry-over pinions and the master wheel are located; the uppermost teeth of the carry-over pinions and the master wheel being in alinement with the locking bar 109, so that as soon as a totalizer enters a computing zone, the computing wheels 66 leave the locking bar, one at a time, to be brought into effective relation with the master wheel and the carry-over pinions. When the totalizer passes out of a computing zone, the transfer wheels again engage with the locking bar 109.

To have the locking bar 109 occupy a minimum space crosswise of the machine, I have provided at the ends of a fixed main section 111 of the locking bar, normally-retracted movable sections 112 and 112$^a$, which may be extended to maintain the transfer wheels 66 locked when the totalizer travels beyond the ends of the main section 111. To do this, I have found it advantageous to locate the sections 112 and 112$^a$ of the locking bar 109 in back of the main section 111 (Figs. 10 and 13). Each section may be guided in a slot 113 formed in the main section 111, and held in its retracted position by means of a return spring 114, connected to a pin 115 on the main section 111, the other end of the spring being connected to a pin 116 secured to the section 112. The springs 114 may be concealed in slots 117 formed in the under side of the sections 112 and 112$^a$, and may be effective to hold the sections 112 and 112$^a$ against shoulders 118; there being lugs 119, projecting from the movable sections, which engage with said shoulders 118. The movable sections are shaped to fit the space between teeth of the computing wheels 66; the engaging portions thereof being located one-tooth-space distance in back of those of the fixed section 111. If the typewriter carriage is moved to one side a sufficient distance to bring one of the totalizers beyond the end of the fixed section 111 of the locking bar 109, a projection 120 on the totalizer 63 engages with the lug 119 to project the latter to move the section 112 or 112$^a$ with the totalizer, thus maintaining the transfer wheels locked after they move beyond the end of the fixed section 111, and thereby temporarily increasing the length of the locking bar 109.

To facilitate the reëngagement of the transfer wheels 66 with the fixed section 111 of the locking bar 109 when the totalizer 63 is moved from a position beyond the end of said section, the latter is provided at each end with beveled edges 121. For a similar reason, the inner ends of the sections 112 and 112$^a$ are also provided with beveled edges 122.

Figure 2:
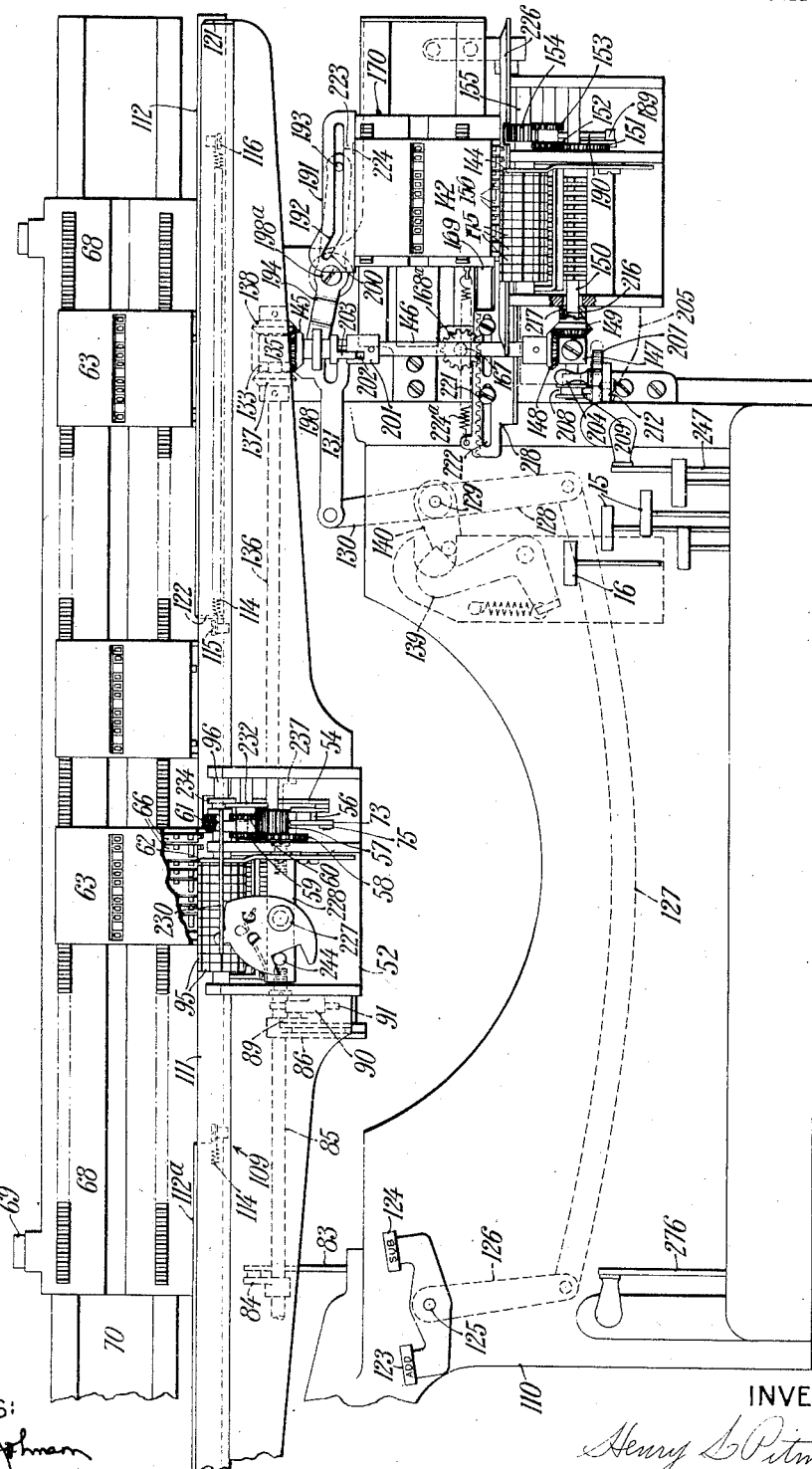
Fig. 2 is a front view of the machine.

The column-computing unit 53 is adapted to perform addition or subtraction. This includes a state-setting mechanism similar to that disclosed in my hereinbefore-mentioned co-pending application, Serial No. 186,098, and may comprise an "add" key 123 and a "sub" key 124 to set the machine to addition and subtraction, respectively. As seen in Fig. 2, the "add" key 123 is shown in its depressed position, thus indicating that the computing mechanism is set for addition. It will also be seen that the gear-wheel 58, when the key 123 is in this position, meshes with the pinion 59 secured to the pinion 60, the latter meshing with the pinion 61, so that the master wheel 62 may be driven in a clockwise direction, as viewed in Fig. 1.

If it is desired to change the state of the actuator 52 to subtraction, the subtraction key is depressed to move the gear wheel 58 out of engagement with the pinion 59 and connect directly with the pinion 61. Thus, when the gear wheel 58 is actuated, the master wheel will be rotated in a counter clockwise direction to rotate the computing wheels 66 and the dial wheels 64 to subtract.

Figure 3:
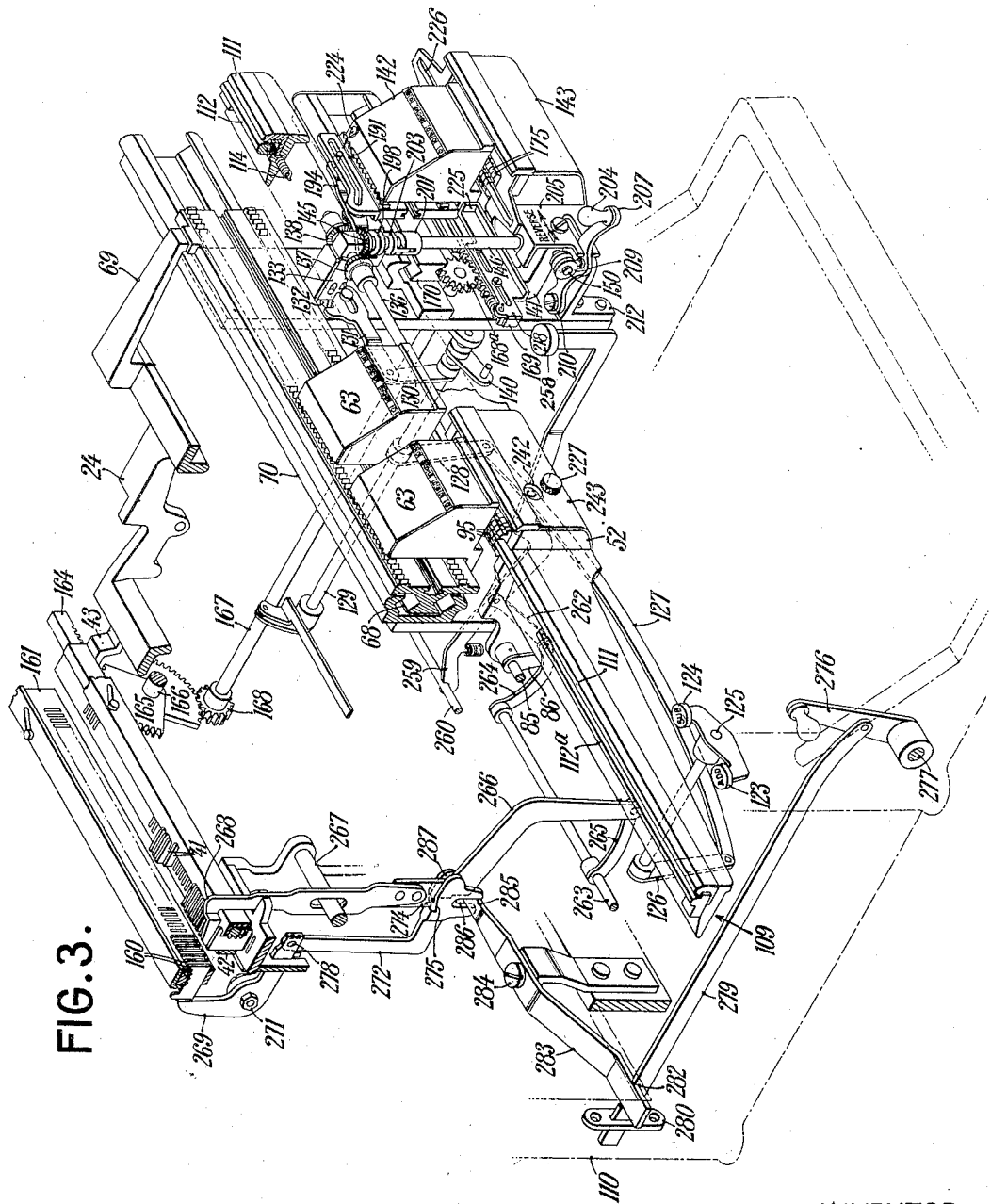
Fig. 3 is a skeleton, perspective view of the machine, viewed from the side opposite to that of Fig 1.

The state-setting mechanism for shifting the gear wheel 58 to render the actuator 52 effective for addition or subtraction comprises a shaft 125, Figs. 2 and 3, which may be rocked in either direction by means of the keys 123 and 124 to swing an arm 126 projecting downwardly from the rock shaft 125; the arm 126 being connected by means of a link 127 to an arm 128 projecting downwardly from a rock shaft 129, the latter, when rocked, moving an upwardly-projecting arm 130 connected by a link 131 to operate a reverse lever 132 (Fig. 3). The reverse lever 132 coöperates with two cams 133, 134 on opposite sides of a bracket 135 (Figs. 1 and 3), in a manner clearly shown and described in my said co-pending application, Serial No. 186,098, filed August 14, 1917, to shift a shaft 136 on which the gear wheel 58 is mounted. The cam slides 133 and 134 may engage with the conical surfaces of a pair of bevel pinions 137 and 138, rigidly secured to the shaft 136. To hold the state-setting mechanism in either one of the two positions, there is provided a spring-actuated detent 139 (Fig. 2), coöperating with an arm 140 secured to the rock shaft 129.

The cross-computing unit 141 comprises a cross-totalizer 142 and an actuator 143. The cross-totalizer 142 travels intermittently with the typewriter carriage 24 through a computing zone, in a manner to be presently described, so that the cross-total of the figures written in predetermined columns may be registered on the cross-totalizer 142.

The actuator of the cross-computing unit comprises a master wheel 144, which may be connected to the driving rack 56 of the master wheel 62. This connection comprises the shaft 136, which is effective to rotate the pinion or bevel gear 138 secured thereto. The pinion 138, when the mechanism is set for addition, as in Fig. 2, meshes with the pinion or bevel gear 145 to rotate a vertical shaft 146, suitably journaled both in the bracket 135 and a bracket 147, and having at its lower end a bevel gear 148, which drives a pinion or bevel gear 149 connected in driving relation with a horizontal shaft 150, Fig. 1. The horizontal shaft 150 has secured thereto a gear wheel 151 similar to the gear wheel 58 of the column-computing unit. This shaft 150, when rotated, rotates a pinion 152 through the intermediary of the gear wheel 151; the pinion 152 being connected to a similar pinion 153, the latter meshing with a pinion 154 to drive a shaft 155 to which the master wheel 144 of the cross-computing unit is secured. The master wheel 144 drives computing wheels 156, which are brought one after another into effective relation therewith as the cross-totalizer passes step by step through the computing zone. The computing wheels 156 are rotatively mounted on a shaft 157 contained within the cross-totalizer 142, and mesh with dial wheels 158 supported on a shaft 159.

To cause the cross-totalizer 142 to travel intermittently with the typewriter carriage, or, in other words, to travel with the typewriter carriage when a number is to be registered therein, as well as in one of the column-totalizers, there are provided on the typewriter carriage pick-up elements or dogs 160 on a bar 161. The elements are normally ineffective but may be set to effective positions, corresponding to those of the column-totalizers, by mechanism which will hereinafter be described.

Each effective pick-up dog 160 usually bears a relation to the corresponding column-totalizer 63, which is such that immediately prior to the entrance of a column-totalizer 63 into the computing zone, the pick-up dog 160 engages with a pick-up hook 162 on a pick-up bar 163 (Fig. 6), included in a train of mechanism extending from the cross-totalizer, so that the latter may move with the typewriter carriage through the computing zone. The train of mechanism further comprises a rack bar 164, which is drawn by the pick-up bar 163 and meshes with a double gear sector 165 (Fig. 3) to move it about a pivot 166 to rotate a shaft 167 by means of a pinion 168 secured to the latter. The shaft 167 extends from the back to the front of the machine and has at its forward end a pinion 168$^a$, meshing with a rack 169 secured to the sub-carriage or cross-computing carriage 170, to move the latter and consequently the cross-totalizer 142 with the column-totalizer 63 and the typewriter carriage. The cross-totalizer 142 remains connected with the typewriter carriage 24 while a computing zone is being traversed. When the column-totalizer passes out of the computing zone, it becomes disconnected from the typewriter carriage through the release of the pick-up mechanism, and is at once restored to its normal position to the right of the master wheel 144.

This release of the pick-up mechanism may be effected by a pin 171 on the pick-up bar 163, which engages with a cam 172 to swing the pick-up bar about its pivot 173 on the rack 164 to disengage the hook 162 from the pick-up dog 160. When this occurs, a return spring 174 coiled around the shaft 167 (Fig. 1) becomes effective to rotate said shaft and restore the cross-totalizer 142 through the intermediary of the pinion 168$^a$.

The cross-computing unit 141 is also provided with a series of carry-over pinions 175, which are rotatively mounted on the shaft 155 contained within the actuator 143. The carry-over pinions 175 are also provided with carry-over detents 177 having downwardly-extending tails 178 with which an alining cam 179 coöperates, in a manner and for a purpose similar to that of the alining cam 100 of the column-computing unit.

To actuate the alining cam 179, the shaft 85, which, it will be remembered, is actuated by the escapement mechanism during the latter part of the upward movement of the type-bar, is connected thereto by a rearwardly-extending arm 180, which, when the shaft 85 is rocked, draws upwardly on a link 181 to rock a shaft 182 by means of an arm 183, to which the link 181 is connected. The shaft 182 is provided with an arm 184, which moves the link 185 dowwardly to rock a shaft 186 fast to the cam 179. This shaft is rocked by means of an arm 187 to which the link 185 is connected. The master wheel 144 is also provided with a detent 188, similar to the detent 103 and actuated by the cam 179.

To assist in accurately positioning the master wheel 144 of the cross-computing unit (Fig. 4), there is provided a pawl 189 similar to the pawl 93 contained within the actuator 52. The pawl 189 may be actuated by a cam 190 secured to the shaft 182, which, it will be remembered, is rocked during the latter part of the upward movement of the type-bar, or, in other words, after the value has been transferred to the totalizer.

In computing machines comprising both column and cross-totalizers and separate master wheels for the column-totalizers and the cross - totalizer, both master wheels usually rotate together when a numeral key is actuated. It is sometimes desired to traverse a computing zone with only a column-totalizer, at which time the cross-totalizer remains idle. I have therefore found it desirable to avoid actuating the master wheel of the cross-computing unit, except when the cross-totalizer is traversing its computing zone. To do this there are provided normally connections which include a break in the train of mechanism extending between the master wheels of the two computing units. When, however, the cross-totalizer is picked up to traverse the computing zone, the connection between the master wheels of the two computing units is made without any attention of the operative.

For this purpose, in the present form of my invention, I have provided at the upper end of the cross-computing carriage 170 a plate 191 having a slot therein forming a cam 192, which, when the cross-totalizer occupies its normal position (Fig. 12), maintains a break in the train of mechanism between the two master wheels, said cam 192 being effective through the intermediary of a pin 193 to hold a lever 194 in a position to retain the bevel gear or pinion 145 on the vertical shaft 146 out of range of the two bevel gears 137 and 138 which form part of the train of mechanism between the two master wheels. The connection between the lever 194 and the pinion 145 may comprise prongs 197 on the lever 194, between which a flange 198 on the pinion 145 engages, so that the pinion may be moved up or down by the lever 194 to make and break the connection of said train of mechanism.

When the cross-totalizer is picked up to travel with the typewriter carriage, the cam swings the lever 194 about its pivot 198$^a$ from the Fig. 12 position, to connect the pinion 145 with the shaft 136 (Fig. 2). It will be remembered that the shaft 136 may have either one of two positions, according to whether the column - computing unit is set for addition or subtraction. Therefore, to make the connection between the shafts 136 and 146, the pinion 145 may engage with either one of the pinions 137 and 138, according to the position of the shaft 136.

The connection of said train of mechanism between the master wheels is completed before the computing wheel 156 of highest denomination is brought into effective relation with the master wheel 144, and is effected when the pin 193 reaches the end of the cam 192. To maintain this connection while the cross-totalizer moves through its computing zone, there is provided a dwell 199 at the end of the cam 192, with which the pin 193 engages to hold the bevel gear or pinion 145 in engagement with either one of the pinions 137, 138. After the cross-totalizer 142 moves out of the computing zone, it becomes released from the typewriter carriage, as hereinbefore described, and is returned to its normal position. During the latter part of the return movement of the cross-totalizer, the connection between the shafts 136 and 146 is broken by means of a bottom cam 200 of the slot engaging with the pin 193 to swing the lever 194 in a counterclockwise direction to withdraw the bevel gear 145 from effective relation with the shaft 136.

The beveled gear 145 is so connected to the shaft 146 to always rotate therewith and so that it may slide thereon to make or break the connection with the shaft 136. This may be done by a collar 201 secured to the shaft 146, and having a slot 202 into which fingers 203 project from the beveled gear 145, there being one finger on each side of the shaft 146.

The master-wheel driving mechanism, as shown in Fig. 2, contained within the actuator 143 of the cross-computing unit, is set to perform the same kind of computation as that of the column-computing unit; or, in other words, the state of both computing units is identical. If, however, it is desired to perform a computation in the cross-computing unit, which is the reverse of the computation performed by the column-computing unit, irrespective of the state of the column-computing unit, the shaft 150 is moved lengthwise of its axis by a reverse key 204 to disengage the gear wheel 151 from the pinion 152, and bring it into mesh with the pinion 154 connected to the master-wheel shaft 155 to connect the gear wheel 151 directly with the pinion 154. Thus, if the shaft 150 is now rotated, the rotation of the master wheel 144 will be in an opposite direction to that of the master wheel 62, and thus the computation of the cross-computing unit will be the reverse of that of the column-computing unit.

It should be understood that if the reverse key is actuated in the direction of the arrow on an indicator plate 205, when the parts are in the Fig. 2 position, the state of the cross-computing unit will be changed to subtraction by shifting the gear 151. It should further be understood that when the column-computing unit is set for subtraction and the reverse key 204 is actuated in the direction of the arrow, the gear wheel 151 will again be shifted into mesh with the pinion 154 to again rotate the master wheel 144 in a reverse direction from that of the master wheel 62 of the column-computing unit; but it will be remembered that the latter is set for subtraction; therefore, the state of the cross-computing unit is changed to addition.

From the foregoing, it follows that when the reverse key 204 occupies the extreme left-hand position, Figs. 2 and 3, the computation performed by the cross-computing unit is identical with that of the column-computing unit, and if it is desired to set the cross-computing unit to perform a reverse computation to that of the column-computing unit, the reverse key is moved in the direction of the arrow to its extreme right-hand position.

To ascertain what kind of computation is taking place in the two computing units, or in other words, the state to which each is set, the operative observes the position of the "Add" key 123 and the "Sub" key 124. If the "add" key is in its depressed position, as in Fig. 2, the operative is informed that the column-computing unit is set to addition. The position of the reverse key 204 is then observed, and if in its extreme left-hand position, it informs the operative that the cross-computing unit is set for addition; as it will be remembered that when the reverse key occupies this position, the computation is identical with that of the column-computing unit. If, however, the reverse key 204 should at this time occupy its extreme right-hand position, it would indicate to the operative that the cross-computing unit is set for subtraction.

The connection between the reverse key 204 and the shaft 150 may comprise a pin 206 projecting upwardly from a lever 207 forming part of the reverse key 204. The pin 206 projects into an annular groove 208 formed in a collar 209 and secured to the shaft 150, so that when the reverse key 204 is swung about its pivot 210 the shaft 150 is moved laterally thereby.

The shaft 150 and consequently the gear wheel 151 may be held in either of its shifted positions by means of a detent spring 211 secured to the under side of a bracket 212, upon which the reverse key 204 is pivotally mounted. The detent spring 211 is provided with a pin 213, which projects through a hole 214 in the bracket 212, and seats itself in any one of two depressions 215 formed on the under side of the lever 207 which carries the reverse key 204.

To permit the sliding movement of the shaft 150 relatively to the beveled gear 149, (Fig. 2), and still retain a rotative connection therewith when the shaft 150 is moved by the reverse key 204, the shaft is provided with a key 216 engaging in a slot 217 formed in the hub of the beveled gear 149.

To avoid overburdening the carriage-propelling means, comprising the spring drum 44, by the load of releasing certain locking means associated with the tens-carry-over mechanism, I have provided a locking element 218 which may be moved by the typewriter carriage to free the carry-over detents 177, without adding to the work done by the spring drum, Figs. 1, 3, 5, 11 and 12. This locking element, which I have shown in connection with the carry-over mechanism of the cross-computing unit, may be in the form of a bar carried by the cross-computing carriage 170, which normally occupies the position shown in Fig. 11, where it lies in back of all of the carry-over detents 177 and bears a locking relation thereto, Fig. 5. The locking bar is located to one side of the cross-totalizer 142 so that when the totalizer is moved with the cross-computing carriage, the locking bar will move clear of the carry-over detents to free them of the locking bar, one by one, as the cross-totalizer moves step-by-step through the computing zone, so that a tens-carry-over may be effected by the carry-over pinions. When the cross-totalizer returns to its normal position, the locking bar will move therewith to the Fig. 11 position, where the carry-over detents are again locked thereby.

When, however, the carry-over detents 177 are freed of the locking bar 218, as during an advancing movement of the cross-totalizer, they again become locked by pawls 219 pivotally mounted within the cross-totalizer. These pawls, similar to those shown and described in my said co-pending application, Serial No. 24,390, engage with the computing wheels 156 which are provided with depressions or cut-outs 220, so that when a dial wheel 158 passes through zero, the cut-out 220 on the corresponding computing wheel 156 is opposite the nose 219ª on the corresponding pawl 219, which, in effect, forms a Geneva lock with its wheel, thereby nullifying the locking effect of the pawl on its associated carry-over detent, so that a tens-carry-over from said dial wheel to the dial wheel of next higher denomination may be effected.

The locking bar 218 may be supported by screws 221 passing through slots 222 in the locking bar and into the cross-totalizer carriage. The slots 222 are elongated to permit an adjustment of the locking bar relatively to the cross-totalizer, as described below; this being desirable, so that the cross-totalizer may be replaced by another having a different number of dial wheels and, consequently, of different width from that in use.

The cross-totalizer may be detachably mounted on the cross-totalizer carriage or sub-carriage 170 in any convenient manner, and is located relatively thereto so that the dial wheel of lowest denomination always has a definite position relative to the sub-carriage. This may be done by means of a scale-mark 223 and a pointer 224, one of which may be on the sub-carriage and the other on the cross-totalizer.

The locking bar 218 is slidingly mounted on the cross-totalizer carriage 170, so that prior to the attaching of the cross-totalizer to the cross-totalizer carriage, it may be moved to its extreme left-hand position against the tension of a spring 224ª, one end of which is connected to the locking bar or slide, the other end being connected to the cross-totalizer carriage. After the totalizer has been properly positioned by means of the pointer 224 and secured in place on the cross-totalizer carriage, the locking bar is permitted to be drawn rightwardly by the spring 224ª until the right-hand end 225 of the locking bar strikes the left side of the cross-totalizer, thus adjusting itself properly relatively to the computing wheels 156. If desired, the locking bar 218 may then be secured in this position by tightening the screws 221.

When the cross-totalizer 142 occupies its normal position to the right of the master wheel, the computing wheels 156 are held against accidental displacement by a locking bar 226 arranged to the right of the master wheel and in alinement with the uppermost tooth thereof and also the uppermost teeth of the carry-over pinions 175.

From the foregoing description, it will be understood that when the cross-totalizer is moved leftwardly, the computing wheels 156 and the carry-over pinions 175 are freed of their respective locking bars 226 and 218, as the computing wheels are brought into effective relation with the master wheel and carry-over pinions. The locking bar 226 is made preferably of sheet-metal and secured to the actuator 143.

It is sometimes desired to actuate only the cross-computing unit. This may be done by first rendering the column-computing unit ineffective. For this purpose the connection from the driving rack 56 to the master wheel 62 may be broken at will, for which purpose I have provided simplified and improved means. This means may include a rotatable finger-piece 227, Figs. 2, 3, 5, 7 and 8, pivotally supported on a fixed block or cross-bar 228 contained within the actuator 52. To disconnect the master wheel of the column-computing unit, the finger-piece 227 is rotated in a clockwise direction from the position indicated in Fig. 2. A projection 229 thereon engages with a slide-bar 230 to move the latter rightwardly. The slide-bar has a downwardly and rearwardly-projecting finger 231 engaging between the pinions 59 and 60; thus the slide-bar 230, by means of said finger, moves the pinions 59 and 61 out of range of the extreme right-hand position of the gear-wheel 58, Fig. 7. Thus the connection from the driving rack to the master wheel is broken, as the gear-wheel 58 in position for adding, if now actuated, will rotate idly.

The mechanism, just described, would not, however, be effective to render the column-computing unit ineffective when gear-wheel 58 is moved to position for subtraction, as a result of the depression of the subtraction key 124. To insure disconnection between the driving rack and the master wheel, provision may be made to shift pinion 61 away from its normal position in which it would be operatively engaged by gear-wheel 58 when in position for subtraction. To this end I have provided a flange 232 on the hub of the pinion 60, engaging in an annular groove 233 in a hub 234 of the pinion 61. Thus the pinion 61 always moves with the pinions 59 and 60 when moved laterally, and, when pinion 59 is moved to the position shown in Fig. 7, pinion 61 will be moved to a position such that gear-wheel 58 will not mesh therewith when moved to position for subtraction.

To retain the connection between the master wheel 62 and pinion 61 when the latter is shifted to disconnect the master wheel, or, in other words, render it ineffective, the left-hand hub of the pinion 61 is provided with slots 235 into which fingers 236 of the master wheel 62 project.

The slide-bar 230 is supported at one end thereof on a cross-bar 237, Fig. 7, and may be held thereon by means of a shouldered screw 238 passing through an elongated slot 239 formed in one end of the slide bar, Figs. 7 and 8. The other end of the slide-bar is supported on a curved face 240 of the finger-piece 227 upon which it rides. The slide-bar is also provided with a slot 241 so that it may readily be connected to the finger-piece and actuated thereby through the projection 229 which engages in the ends of the slot 241.

To indicate whether the column-computing unit is connected or disconnected, the finger-piece is provided with indications "C" and "D," denoting connect and disconnect, respectively. These indications may be viewed through a sight-opening 242 formed in a cover-plate 243 of the actuator 52, Figs. 3 and 7.

To limit the movement of the finger-piece 227 in either direction, there is provided a stop 244 projecting forwardly on the cross-bar 228.

To hold the finger-piece 227, and consequently the parts controlled thereby, in the positions to which they may be shifted, there is provided a detent-spring 245, which is effective to engage on either side of a pin 246 of the finger-piece 227. So that the pin 246 may move well to one side or the other of the detent 245, the finger-piece 227 moves through a greater extent than is required to move the slide-bar 230. For this purpose, I have provided lost-motion between the lug 229 and slot 241, which form the connection between the finger-piece and slide-bar, Fig. 8.

Both computing units may be rendered ineffective, or disconnected, by means of a non-compute key or lever 247, which is pulled forwardly about its pivot 248 to thrust rearwardly a link 249 connected to the lower end thereof. Said link 249 swings a bell-crank 250 about its pivot 251 to depress a connecting lever or pawl 252 by means of a pin 253, to break the connection between the differential oscillator 47 and the bail 46. The connecting lever 252 is pivotally mounted at 254 on a lever 255, the latter being loosely mounted on the rock shaft 48. A spring 256 normally holds the connecting lever 252 effectively connected with the bail 46 by means of a stud 257 projecting from the right-hand side of the bail 46, with which said lever engages. The non-compute lever may be held in any of its positions by any convenient form of friction device or detent. Thus, from the foregoing, it will be understood that when the pawl 252 is in its depressed position, the stud 257 will move idly relatively to the oscillator 47, when the bail 46 is actuated by any one of the numeral keys. If, however, the pawl 252 is in its raised position, where it is held by the spring 256 to embrace the stud 257, as seen in Fig. 1, the lever 255 is, in effect, directly connected with the bail 46. Thus, if the bail 46 is actuated by any one of the numeral keys, the oscillator 47, comprising the pawl 252 and the lever 255, will transfer an equivalent movement to the master wheel 62, as hereinbefore described.

It will be understood that, while the effect of the automatic making and breaking of the connection between the two master wheels, by means of the beveled gear 145, is entirely independent of the shifting of the non-compute key 247 to its forward or non-compute position, there will be no actuation of the master wheels while the non-compute key is in forward position, and consequently no computation.

The column-stops 41, of which there is one for each letter-space position, may be set by a key 258 at the front of the machine, which, when depressed, swings a lever 259 about a pivot 260 against a return spring 261. The lever 259 is arranged at one side of the machine, and thrusts downwardly on a link 262 to rock a shaft 263 by means of an arm 264 extending from the latter. The rock shaft 263 has extending therefrom, near the middle of the machine, another arm 265 which pulls downwardly on a link 266 guided in its movement at 267, Fig. 1, to move a stop-setting finger 268 downwardly to set the underlying column-stop 41; the carriage having previously been positioned to bring the proper column-stop into register with the setting finger 268.

Simultaneously with the setting of the column-stop 41, the pick-up element or dog 160, corresponding to the same letter-space position, may also be set. To do this, there is provided for the pick-up dogs 160, of which there is also one for each letter-space position, a setting finger 269 forming the upper end of a bell-crank lever 270, which may be swung about a pivot 271 by means of a link 272; the link 272 being actuated against the tension of a spring 273 by the link 266, which has a hook 274 overlying a shoulder 275 formed on the link 272. The engaging surfaces of the hook 274 and the shoulder 275 are inclined slightly so as to overcome any possible tendency of the connection therebetween to spring apart during a stop-setting and a dog-setting operation.

It is sometimes desired to actuate only the stop-setting finger 268, as, for example, in a position having a column-totalizer arranged thereat, in which computations are to be effected without the cross-totalizer. For this purpose, I have provided a key 276 arranged near the front and at the left-hand side of the machine, Fig. 3. This key, when swung forwardly (Fig. 15) about its pivot 277, swings the link 272 about its point of connection 278 with the bell-crank 270 to move the shoulder 275 clear of the hook 274 on the stop-setting link 266. Thus, the stop-setting link 266 may be actuated and the hook 274 thereon moved idly past the shoulder 275.

The connection between the key 276 and the link 272 may comprise a link 279 guided at its rear end in a plate 280 secured to the machine frame 110 in any convenient manner. The link 279 is provided with a slot 282 into which projects one end of a horizontally-disposed lever 283, so that the latter may be moved about its pivot 284 when the link 279 is actuated. The lever 283 lies crosswise of the machine, and has its inner end 285 located near the center thereof, projecting into a slot 286 formed in the lower end of the link 272, thus forming an effective connection to swing the link 272 out of, or into, effective relation with the stop-setting link 266. To guide the lower end of the link 272 during the shifting movements thereof, it is provided with a slot 287 so that it may embrace the link 266. Any convenient means, such as friction of the lever 276 on its pivot 277, may be provided to retain the lever 276, and consequently the parts controlled thereby, in the positions to which they may be moved.

Variations may be resorted to within the scope of the invention, and portions of the improvements may be used without others.

Having thus described my invention, I claim:

1. The combination of a totalizer comprising computing elements, and a locking bar comprising sections, one of which may be extended relatively to the other, so as to increase the length of said locking bar.

2. The combination of a totalizer comprising computing elements, a locking bar for said computing elements, and means to increase the range of utility of said locking bar.

3. The combination of a totalizer comprising transfer elements, a locking bar for said transfer elements, said locking bar comprising a fixed section and a movable section, said totalizer being adapted to traverse said locking bar and move beyond the end of said fixed section, and means for extending said movable section when said totalizer moves beyond the end of said fixed section.

4. The combination of a totalizer comprising transfer elements, a locking bar for said transfer elements, said locking bar comprising a fixed section and a movable section, said totalizer being adapted to traverse said locking bar and move beyond the end of said fixed section, and means for extending said movable section when said totalizer moves beyond the end of the said fixed section, each section being tapered at one end to assist in guiding the transfer elements when they move from one section to another.

5. The combination of a totalizer comprising transfer elements, a locking bar for said transfer elements, said locking bar comprising a fixed section and a movable section, said totalizer being adapted to traverse said locking bar and move beyond the end of said fixed section, and means to cause said movable section to travel with said totalizer when the latter moves beyond the end of said first-mentioned section.

6. The combination of a carriage, a totalizer comprising transfer elements, and a locking bar for said transfer elements, said locking bar comprising a fixed section and a movable section, said totalizer being adapted to traverse said locking bar and move beyond the end of said fixed section, the other section being adapted to travel with said totalizer when the latter moves beyond the end of said fixed section, said movable section being guided to move parallel to said first-mentioned section.

7. The combination of a carriage, a totalizer comprising transfer elements, and a locking bar for said transfer elements, said locking bar comprising a fixed and a movable section, said totalizer being adapted to traverse said locking bar and move beyond the end of said fixed section, said carriage being effective to move said movable section to a position where it may lock said transfer elements when said totalizer moves beyond the end of said fixed section.

8. The combination with a carriage, of a totalizer adapted to travel with said carriage through a computing zone, said totalizer comprising transfer elements, and a locking bar having a gap therein at the computing zone, said locking bar being effective to prevent displacement of said transfer elements when said totalizer is traversing said locking bar except at said computing zone, said locking bar comprising a fixed section and two movable sections, one at each side of said fixed section adapted to lock said transfer elements when said totalizer travels beyond either end of said locking bar.

9. The combination with a carriage and a column-computing unit comprising a master wheel and one or more totalizers, of a cross-computing unit comprising two elements, namely, a master wheel and a totalizer, normally diconnected means for causing one of said elements to travel relatively to the other and intermittently with said carriage, normally diconnected driving means for the master wheel of said cross-computing unit, and means for connecting said driving means by movement of the traveling element from normal position.

10. The combination with a carriage and a column-computing unit comprising a master wheel and one or more totalizers, of a cross-computing unit comprising two elements, namely, a master wheel and a totalizer, one of said elements being adapted to travel relatively to the other and intermittently with said carriage, normally disconnected driving means for the master wheel of said cross-computing unit, and means for connecting said driving means when said traveling element moves with said carriage.

11. The combination with a carriage, of two master wheels, a master-wheel drive, including a driving shaft, for each of said master wheels, totalizers, driving mechanism for one of said driving shafts, a normally ineffective connection between the two shafts, means for automatically rendering said connection effective at predetermined positions in the travel of said carriage, and means for reversing the drive between the second driving shaft and the corresponding master wheel.

12. The combination with a carriage, of computing mechanism, comprising two master wheels, a master-wheel drive, including a driving shaft, for each of said master wheels, totalizers, driving mechanism for one of said driving shafts, a normally ineffective connection to the other shaft, means, including settable devices on said carriage, for rendering said connection effective at predetermined positions in the travel of said carriage, and means for reversing the drive between the second driving shaft and the corresponding master wheel 13. The combination of a column-computing unit, a cross-computing unit, each unit comprising two elements, namely, a totalizer and a master wheel, one of said elements being adapted to travel relatively to the other, the traveling element of said cross-computing unit being adapted to travel intermittently with the traveling element of said column-computing unit; normally-ineffective driving mechanism for the master wheel of said cross-computing unit, and means for automatically rendering said driving mechanism effective when the traveling element of said cross-computing unit is to be moved.

14. The combination of a carriage, a column-computing unit, a cross-computing unit, each unit comprising two elements, namely, a totalizer and a master wheel normally clear thereof, normally-ineffective driving mechanism for the master wheel of said cross-computing unit, and means controlled by said carriage for intermittently rendering said driving mechanism effective by bringing the master wheel and totalizer into coöperative relation.

15. The combination of a column-computing unit, a cross-computing unit, each unit comprising two elements, namely, a totalizer and a master wheel, one of said elements being adapted to travel relatively to the other, the traveling element of said cross-computing unit being adapted to travel intermittently with the traveling element of said column-computing unit, normally-ineffective driving mechanism for the master wheel of said cross-computing unit comprising a shiftable element, and means controlled by said carriage for intermittently rendering said driving mechanism effective, said means comprising a cam and a lever, said lever engaging with said shiftable element of said driving mechanism.

16. The combination of a carriage, a column-computing unit, a cross-computing unit, each unit comprising two elements relatively movable, namely, a totalizer and a master wheel, normally-ineffective driving mechanism for the master wheel of said cross-computing unit, means controlled by said carriage for intermittently rendering said driving mechanism effective, and means for positively maintaining said driving mechanism effective during the movement of the traveling element of said cross-computing unit.

17. The combination of a carriage, a column-computing unit, a cross-computing unit, each unit comprising two elements relatively movable, namely, a totalizer and a master wheel, normally-ineffective driving mechanism for the master wheel of said cross-computing unit, means controlled by said carriage for intermittently rendering said driving mechanism effective, means for positively maintaining said driving mechanism effective during the movement of the traveling element of said cross-computing unit, and means for rendering said driving mechanism ineffective when said last-mentioned traveling element returns to its normal position.

18. The combination of a carriage, a totalizer traveling with said carriage, a master wheel for said totalizer, a cross-totalizer, a cross-totalizer carriage, a master wheel for said cross-totalizer, means to cause said cross-totalizer carriage to travel intermittently with said first-mentioned carriage, normally-ineffective driving mechanism for the master wheel associated with said cross-totalizer, and means actuable by said cross-totalizer carriage for rendering said driving mechanism effective.

19. The combination of a carriage, a totalizer traveling with said carriage, a master wheel for said totalizer, a cross-totalizer, a cross-totalizer carriage, a master wheel for said cross-totalizer, means to cause said cross-totalizer carriage to travel intermittently with said first-mentioned carriage, normally-ineffective driving mechanism for the master wheel associated with said cross-totalizer, said driving mechanism comprising a train of gearing including a slidable pinion, and means including a lever associated with said pinion actuable by said cross-totalizer carriage for rendering said driving mechanism effective.

20. The combination with a carriage, of a totalizer traveling with said carriage, a master wheel for said totalizer, driving mechanism for said master wheel, a cross-totalizer, a master wheel for said cross-totalizer, means to cause said cross-totalizer to travel intermittently with said carriage, a normally-open connection between said master wheels, and means controlled by said carriage for closing said connection.

21. The combination of a carriage, a totalizer traveling with said carriage, a master wheel for said totalizer, driving mechanism for said master wheel, a cross-totalizer, a cross-totalizer carriage, a master wheel for said cross-totalizer, means to cause said cross-totalizer carriage to travel intermittently with said first-mentioned carriage, a normally-ineffective connection between said master wheels, and means actuable by said cross-totalizer carriage for rendering said connection effective.

22. The combination with a carriage, of two totalizers, a master wheel for each totalizer, a master-wheel drive, including a driving shaft, associated with each of said master wheels, each driving shaft having a gear thereon, a third shaft, a gear thereon constantly connected to the gear on one of said driving shafts, a gear slidably mounted on the third shaft, and means controlled by said carriage for connecting said slidable gear with the gear on the other of said driving shafts.

23. The combination with a carriage, of two totalizers, each totalizer having a master wheel, each master wheel having a shaft associated therewith, means, including a cross-computing carriage, for causing a relative traveling movement between one of said master wheels and its totalizer, means to cause the cross-computing carriage to travel intermittently with the first-named carriage, a sliding member connected with the shaft associated with the cross-computing master wheel, and means controlled by said cross-computing carriage for shifting said slidable member to connect or disconnect the shaft connected therewith with the other of said shafts.

24. The combination with a computing-unit comprising two elements, namely, a master wheel and a totalizer, one of said elements traveling relatively to the other, of driving mechanism for said master wheel, means for automatically rendering said driving mechanism effective when said two elements are brought into coöperative relation, a non-compute key, and means controlled from said non-compute key to nullify the effect of said automatic means.

25. The combination with a carriage, of a column-totalizer traveling with said carriage, a master wheel for said column-totalizer, driving mechanism for said master wheel, a cross-totalizer, a master wheel for said cross-totalizer, means to cause said cross-totalizer to travel intermittently with said carriage, a normally-open connection between said master wheels, means controlled by said carriage for closing said connection, numeral keys, a train of mechanism actuable by and extending from said numeral keys to the master wheel for said column-totalizer, and a non-compute key, said key being effective to nullify the effect of the connection-closing means.

26. In a computing machine, the combination of a master wheel, driving mechanism for said master wheel, and means to cause a change in said driving mechanism to enable the master wheel to be reversely rotated, said means comprising a slidable shaft, a single key engaging directly with said shaft, a detent-coöperating with said key, and an indicator for said key.

27. In a computing machine, the combination of a master wheel, driving mechanism for said master wheel, a second master wheel, a train of mechanism from one master wheel to the other, and means to cause a change in said train of mechanism to enable the second-mentioned master wheel to be reversely rotated relatively to the other, said means comprising a slidable shaft, a single key engaging directly with said shaft, a detent coöperating with said key, and an indicator for said key.

28. The combination of a totalizer adapted to move through a computing zone, carry-over elements, a device common to all of said carry-over elements to maintain the latter locked while said totalizer is outside of the computing zone, and means moved by the totalizer as it travels step by step to move said device to free said carry-over elements from control of said device, one by one.

29. The combination with a carriage, of a totalizer settable thereon, carry-over elements relatively to which the carriage moves, locking means for said carry-over elements on said carriage adapted to free said carry-over elements, one by one, as the carriage moves step by step, and means for mounting said locking means to permit the setting of the totalizer to properly position the locking means along the carriage.

30. The combination of a carriage, a totalizer, a cross-adding carriage for said totalizer adapted to travel with said carriage through a computing zone, a master wheel for said totalizer, driving mechanism for the master wheel, a normally open connection between the driving mechanism and the master wheel, means for intermittently connecting the cross-adding carriage to the first carriage to cause it to travel therewith, and means for automatically closing the first connection by movement of the cross-adding carriage.

31. The combination of a main carriage, a sub-carriage, a totalizer adapted to move through a computing zone, carry-over elements, a locking device for all of said carry-over elements, said device being carried by said sub-carriage, and means controlled by said main carriage for moving said sub-carriage to free said carry-over elements of said locking device, one by one, as the totalizer moves step by step through the computing zone.

32. The combination of a carriage, a totalizer adapted to move through a computing zone, carry-over elements fixed against traveling movement, and a slide-bar common to all of said carry-over elements to maintain the latter locked, said slide-bar being adapted to travel with said carriage to free said carry-over elements of said slide-bar as the totalizer passes through the computing zone.

33. The combination of a carriage, a totalizer adapted to move through a computing zone, carry-over wheels, elements engaging with said wheels, and a slide-bar common to all of said elements to maintain said carry-over wheels locked, said slide-bar being adapted to travel with said carriage to free said elements of said slide-bar as the totalizer passes through the computing zone.

34. The combination of a totalizer movable through a computing zone, a series of movable elements placed alongside of each other, a common locking bar for said elements, and means for freeing said elements of said locking bar, one after another, as the totalizer traverses the computing zone.

35. The combination with a totalizer comprising computing wheels, of carry-over mechanism comprising a series of carry-over elements, detents for said carry-over elements, a member associated with each of said computing wheels, means on each of said computing wheels to position, except for one of a plurality of positions of each computing wheel, the corresponding member to hold in locking position a detent which is in position to be controlled thereby, a locking device common to all of said detents, and means to free said detents one by one from the control of said locking device and bring said detents under the control of said members associated with said computing wheels immediately upon release by said locking device.

36. The combination with column-totalizers, of a cross-totalizer having computing wheels and adapted to travel intermittently through a computing zone, and an element to prevent accidental displacement of said computing wheels while said cross-totalizer occupies its normal position outside of the computing zone.

37. The combination with column-totalizers, of a cross-totalizer having computing wheels, a master wheel for said cross-totalizer, said cross-totalizer being adapted to travel intermittently with said column-totalizers to traverse said master wheel, and means, including a locking bar engaging the computing wheels, to prevent accidental displacement thereof when said cross-totalizer is in its normal position, and to free said computing wheels, one at a time, as they are brought into effective relation with said master wheel.

38. The combination with a totalizer comprising computing wheels, of a master wheel, carry-over pinions, a locking bar to prevent accidental displacement of said computing wheels when said totalizer is in its normal position, means, including a second locking bar, to prevent accidental displacement of said carry-over pinions, and means to free said computing wheels and said carry-over pinions from the control of their respective locking bars, by bringing the computing wheels and carry-over pinions into effective relation.

39. The combination with a carriage, of a totalizer comprising computing wheels, a master wheel, carry-over pinions, a fixed locking bar to prevent accidental displacement of said computing wheels, a movable locking bar to prevent accidental displacement of said carry-over pinions, and means controlled by said carriage for moving said totalizer and said movable locking bar to free said computing wheels and said carry-over pinions as they are brought into effective relation with each other.

40. The combination with a carriage, of a totalizer, carry-over elements, locking means for said carry-over elements, and means to cause a relative movement between said carry-over elements and said locking means to free said carry-over elements of said locking means, said movement being controlled by said carriage.

41. The combination with a totalizer, means to cause said totalizer to traverse a computing zone, carry-over elements, locking means for said carry-over elements, said locking means being normally effective, means to move said locking means, by traverse of the totalizer, to render it ineffective when said totalizer traverses the computing zone, and means to cause said locking means to return to effective position when the totalizer passes out of the computing zone.

42. In a computing machine comprising a carriage and a totalizer, the combination of carry-over elements, locking means for said carry-over elements, and means to cause said locking means to be actuated intermittently during the travel of said carriage to free said carry-over elements.

43. In a computing machine comprising a carriage and a totalizer, the combination of carry-over elements past which said carriage and totalizer travel, a locking bar for said carry-over elements, and means to cause said locking bar to travel intermittently with said carriage to free said carry-over elements.

44. The combination with a carriage, of a totalizer, carry-over elements, and locking means for said carry-over elements, said totalizer being settable on said carriage, and said locking means being adjustable relatively to said totalizer.

45. The combination with a carriage, of a totalizer, carry-over elements, locking means for said carry-over elements, said totalizer being settable on said carriage, said locking means being slidable on said carriage, and a spring for holding said locking means against said totalizer.

46. The combination with a carriage, of a totalizer, carry-over elements, locking means for said carry-over elements, said totalizer being settable on said carriage, said locking means being adjustable on said carriage, and means for holding said locking means after it has been adjusted relatively to said totalizer.

47. The combination with a carriage and propelling means therefor, of a totalizer, carry-over elements, and locking means for said carry-over elements, said locking means being disposed to be moved by said carriage to free said carry-over elements without altering the resistance offered to said propelling means.

48. The combination of a master wheel, driving means therefor comprising two elements, a slide-bar for moving one of said elements out of engagement with the other, and a detent engaging with said slide-bar.

49. The combination of a master wheel, driving means therefor comprising two elements, a slide-bar for moving one of said elements out of engagement with the other, a detent, and a single key engaging with said slide bar.

50. The combination of a master wheel, driving means therefor comprising two elements, a slide-bar for moving one of said elements out of engagement with the other, a finger-piece to move said slide-bar, said finger-piece having a lost-motion relatively to said slide-bar, and a detent coöperating with said finger-piece to hold said slide-bar in any of its positions.

51. The combination of a master wheel, driving means therefor comprising two elements, a slide-bar for moving one of said elements out of engagement with the other, a rotatable key to move said slide-bar, said key having a lost-motion relatively to said slide-bar, a detent coöperating with said key to hold said slide-bar in any of its positions, and a stop for limiting the movement of said key.

52. The combination of a master wheel, driving mechanism therefor comprising a gear and a pinion, a slide engaging with said pinion to move the latter out of engagement with said gear, a finger-piece for shifting said slide, a detent for maintaining said slide in its shifted positions, and an indicator to show the condition of said pinion relatively to said gear.

53. The combination of a master wheel, driving mechanism for said master wheel, means for disconnecting said master wheel from said driving mechanism, said means comprising a slide-bar and a finger-piece, a detent, an indicator, and a shield having a sight-opening therein through which said indicator may be viewed.

54. The combination of a master wheel, driving mechanism for said master wheel, means for effecting a change in the driving mechanism for said master wheel, said means comprising a slide-bar and a single key, a detent coöperating with said key, and an indicator for said key, said key engaging directly with said slide-bar.

55. In a combined typewriting and computing machine, the combination with a carriage and an array of settable elements thereon, of a second array of settable elements on the carriage, an arm for setting the elements of said first array, a separate arm for setting the elements of said second-mentioned array, an interponent shiftable to render one or both setting arms effective at the actuation of one, a finger-piece, a link pivoted on said finger-piece, and a pivoted lever engaging said link at one end, and engaging directly with said interponent at the other end.

56. In a combined typewriting and computing machine, the combination with a carriage and an array of settable elements thereon, of a second array of settable elements on the carriage, an arm for setting the elements of said first array, a separate arm for setting the elements of said second-mentioned array, an interponent pivoted on one of said setting arms, and means for shifting said interponent into or out of engagement with the other setting arm.

57. In a combined typewriting and computing machine, the combination with a carriage and an array of settable elements thereon, of a second array of settable elements on the carriage, an arm for selectively setting the elements of said first array, a separate arm for setting the elements of said second-mentioned array, an interponent pivoted on one of said setting arms and engaged by the other to be guided thereby, a lug on said other arm, means for shifting said interponent into or out of engagement with the lug to cause it to be effective or ineffective therewith, and a key connected to one of said setting arms for operating it.

58. In a combined typewriting and computing machine, the combination of an array of settable column-stops, a set of settable pick-up elements, a device for selectively setting said column-stops, a separate device for selectively setting said pick-up elements, an interponent pivoted on said last-mentioned setting device and guided by said first-mentioned setting device, a key for the latter, means for shifting said interponent into or out of effective relation with said first-mentioned setting device, said shifting means comprising a finger-piece, a link connected to said finger-piece, and a horizontally-disposed lever connected at one end to said link, the other end engaging with said interponent.

59. The combination with a totalizer mounted for movement, of totalizer-actuating mechanism past which said totalizer is moved to enable computation, comprising carry-over mechanism, including elements whereby the corresponding parts of said carry-over mechanism may be locked, a bar common to all of said elements to maintain them in locking position when said totalizer is not in coöperative relation with said totalizer-actuating mechanism, and means whereby, upon movement of said totalizer past said totalizer-actuating mechanism, said bar will be moved to release said elements successively and thereby release the corresponding parts of said carry-over mechanism.

60. The combination with a set of computing wheels, of actuating mechanism therefor, said set of computing wheels and said actuating mechanism being mounted for relative movement past each other to enable computation, said actuating mechanism comprising carry-over mechanism, elements whereby the corresponding parts of said carry-over mechanism may be locked, a bar common to all of said elements to maintain them in locking position when said computing wheels and actuating mechanism are not in coöperative relation, and means whereby, upon movement of said computing wheels and said actuating mechanism past each other, to enable computation, said bar will be moved to release said elements successively.

61. The combination with master mechanism and a set of toothed computing wheels, mounted for movement past said master mechanism to enable computation, of a slidably-mounted bar positioned so that, upon movement of said computing wheels to a position to coöperate with said bar, said bar will enter between the teeth of said computing wheels to lock the same, and means to cause said bar to move with said set of toothed computing wheels when the outer end of said bar has been reached by said set of computing wheels.

62. The combination with master mechanism and a set of toothed computing wheels mounted for movement past said master mechanism to enable computation, of locking means to prevent displacement of said computing wheels when out of the effective range of said master mechanism, including two bars slidably mounted on opposite sides of said master mechanism, so that, upon movement of said set of computing wheels, in either direction, to coöperate with said bars, said bars will enter between the teeth of the same, and means whereby either of said bars will be moved with said computing wheels after movement of said computing wheels along that bar to the end thereof.

63. The combination with a set of toothed computing wheels and master mechanism for actuating the same, said set of computing wheels and said master mechanism being movable past each other to enable computation, of a slidably-mounted bar, means whereby said bar is held against traveling movement with respect to said master mechanism while said computing wheels and said master mechanism are in coöperative relation, said bar being so positioned that it will enter between the teeth of said computing wheels when the bar and the computing wheels are brought into coöperative relation, and means whereby, upon bringing the outer end of said bar and said set of computing wheels into coöperative relation, said bar will be connected to said computing wheels, so as to prevent relative traveling movement therebetween.

64. In a combined typewriting and computing machine, the combination with a master mechanism, of a totalizer, mounted for movement past said master mechanism, comprising a set of toothed computing wheels and locking means for said computing wheels, to prevent displacement of the same when out of operative relation with said master mechanism, including a fixed bar to enter between the teeth of said computing wheels as the latter move out of coöperative relationship with said master mechanism, a fixed guideway extending from the vicinity of said fixed bar to the side of the machine, a second bar mounted for movement along said guideway, and positioned to enter between the teeth of said computing wheels, and means whereby, when the totalizer reaches the end of said second bar, the latter will be caused to travel with said totalizer, the connection between the guideway and the second bar being such as to maintain the latter in locking position with reference to said computing wheels while said second bar is being moved outwardly along said guideway.

65. The combination with a totalizer, comprising computing elements, of master mechanism for actuating said computing elements, and locking means to prevent displacement of said transfer elements when not in position to coöperate with said master mechanism, including a fixed guideway, a bar mounted for movement along said guideway, and adapted to coöperate with said computing elements and lock the same against movement, and means whereby, upon movement of said totalizer beyond the end of said fixed guideway, said bar will be caused to travel with said totalizer.

66. In a computing machine, the combination with a totalizer, of actuating means therefor, including a master wheel, a primary gear, numeral-key-driven means to rotate said gear, two pinions, means to cause said gear to mesh with one or the other of said pinions, means to simultaneously shift both of said pinions into and out of position to be engaged by said gear, means whereby rotation of one of said pinions will effect rotation of said master wheel in one direction, and means whereby rotation of the other of said pinions will effect opposite rotation of said master wheel.

67. The combination with a totalizer and a master wheel, of means including a carriage for effecting relative travel between the totalizer and the master wheel, driving mechanism for said master wheel, a cross-totalizer, a cross-master-wheel for actuating said cross-totalizer, means including a cross-adding-carriage to effect relative travel between the cross-totalizer and its master wheel, a normally open connection between the driving mechanism and said cross-master-wheel, and means for automatically closing said connection by movement of the cross-adding-carriage with said first carriage.

68. In a combined typewriting and computing machine, the combination with a column-totalizer, a master wheel therefor, and means, including a carriage, for effecting a relative traveling movement between said column-totalizer and the master wheel therefor, of a master-wheel-drive for said master wheel, including a primary driving shaft, a cross-totalizer, a cross-master-wheel therefor, means including a cross-adding-carriage for causing a relative traveling movement between said cross-totalizer and its master wheel, means to cause said cross-adding-carriage to travel with said first-mentioned carriage during the passage of the latter through predetermined parts of its path, means, including a connecting shaft, normally ineffective but rendered effective by the movement of said cross-adding-carriage with said first-mentioned carriage for driving said cross-master-wheel from said primary driving shaft, and means for shifting said primary driving shaft, and thereby reversing the drive between said primary driving shaft and the master wheel of said column-totalizer, and reversing the driving relation between said primary driving shaft and said connecting shaft when said connecting means is made effective by movement of said cross-adding-carriage with said first-mentioned carriage.

HENRY L. PITMAN.

Witnesses:
 EDITH B. LIBBEY,
 CATHERINE A. NEWELL.